US011279183B2

(12) United States Patent
Bout (10) Patent No.: US 11,279,183 B2
(45) Date of Patent: Mar. 22, 2022

(54) METHOD AND DEVICE FOR REPROGRAMMING TPMS TIRE SENSOR DATA IN A VEHICLE CONTROL SYSTEM

(71) Applicant: ATEQ, Les Clayes sous Bois (FR)

(72) Inventor: Michel Bout, Singapore (MY)

(73) Assignee: ATEQ, Les Clayes sous Bois (FR)

( * ) Notice: Subject to any disclaimer, the term of this patent is extended or adjusted under 35 U.S.C. 154(b) by 294 days.

(21) Appl. No.: 15/723,366

(22) Filed: Oct. 3, 2017

(65) Prior Publication Data
US 2018/0194176 A1     Jul. 12, 2018

Related U.S. Application Data

(60) Provisional application No. 62/443,943, filed on Jan. 9, 2017.

(51) Int. Cl.
*B60C 23/04*     (2006.01)
*G07C 5/08*     (2006.01)

(52) U.S. Cl.
CPC ...... *B60C 23/0471* (2013.01); *B60C 23/0461* (2013.01); *B60C 23/0472* (2013.01); *B60C 23/0479* (2013.01); *G07C 5/0816* (2013.01)

(58) Field of Classification Search
None
See application file for complete search history.

(56) References Cited

U.S. PATENT DOCUMENTS

| 7,688,192 B2 | 3/2010 | Kenny et al. |
| 8,186,208 B2 | 5/2012 | Matsumura |
| 8,635,091 B2 | 1/2014 | Amigo et al. |
| 9,050,862 B2 | 6/2015 | Mouchet |

(Continued)

FOREIGN PATENT DOCUMENTS

| CN | 103921692 A | 7/2014 |
| CN | 204605424 U | 9/2015 |

(Continued)

OTHER PUBLICATIONS

Bartec USA TPMS Professionals, TECH400SD-TECH400SD Tool Bartec, pp. 1-2. http://www.bartechusa.com/tech400sd.html. Website last visited Aug. 16, 2016.

(Continued)

*Primary Examiner* — Christian Chace
*Assistant Examiner* — Amelia Vorce
(74) *Attorney, Agent, or Firm* — Young Basile Hanlon & MacFarlane, P.C.

(57) ABSTRACT

A system and method for resetting or reprogramming tire pressure monitoring system (TPMS) tire sensor data in a vehicle control system or electronic control unit (ECU). The system and method uses a single TPMS relearning tool which (a) receives a first TPMS tire sensor data signals from the TPMS tire sensors, (b) initiates the vehicle control system to enter into a relearning or resetting mode, and (c) re-emits the first TPMS tire sensor data signal as a second TPMS tire sensor data signal to the vehicle control system to reset the vehicle control system to the present TPMS tire sensor data. In one example, the TPMS relearning tool decodes, stores in memory, encodes and transmits a second TPMS tire sensor data signal which simulates the first TPMS tire sensor data signal.

17 Claims, 5 Drawing Sheets

(56) References Cited

U.S. PATENT DOCUMENTS

| | | | |
|---|---|---|---|
| 9,091,537 B2 | 7/2015 | Farr et al. | |
| 9,122,423 B2* | 9/2015 | McIntyre | B60C 23/0471 |
| 9,296,266 B1* | 3/2016 | Chen | B60C 23/0479 |
| 10,430,026 B2* | 10/2019 | Merg | G06Q 10/20 |
| 2005/0132792 A1* | 6/2005 | Lemense | B60C 23/0416 |
| | | | 73/146.4 |
| 2006/0208864 A1* | 9/2006 | Nantz | B60C 23/0408 |
| | | | 340/447 |
| 2009/0021362 A1* | 1/2009 | Kochie | B60C 23/0408 |
| | | | 340/442 |
| 2009/0043441 A1* | 2/2009 | Breed | G06K 7/10178 |
| | | | 701/31.9 |
| 2010/0066523 A1* | 3/2010 | Miller | G07C 5/008 |
| | | | 340/442 |
| 2011/0304454 A1* | 12/2011 | Lickfelt | B60C 23/0418 |
| | | | 340/447 |
| 2012/0065834 A1* | 3/2012 | Senart | G07C 5/008 |
| | | | 701/31.4 |
| 2012/0089299 A1* | 4/2012 | Breed | B60C 11/24 |
| | | | 701/36 |
| 2012/0259884 A1* | 10/2012 | Donehue | G06Q 10/0875 |
| | | | 707/769 |
| 2013/0061456 A1* | 3/2013 | Lefaure | B60C 23/0408 |
| | | | 29/595 |
| 2013/0106596 A1* | 5/2013 | Mouchet | B60C 23/02 |
| | | | 340/445 |
| 2015/0015388 A1* | 1/2015 | McIntyre | B60C 23/0471 |
| | | | 340/447 |
| 2015/0015389 A1* | 1/2015 | McIntyre | B60C 23/0471 |
| | | | 340/447 |
| 2015/0029016 A1 | 1/2015 | Lesesky et al. | |
| 2016/0082791 A1 | 3/2016 | Lin | |
| 2016/0214445 A1* | 7/2016 | Sogabe | B60C 23/04 |
| 2017/0028796 A1* | 2/2017 | Patel | B60C 23/0408 |
| 2017/0028797 A1* | 2/2017 | Kitagawa | B60C 23/0415 |
| 2017/0058811 A1* | 3/2017 | Misson | F02D 41/2487 |
| 2018/0130267 A1* | 5/2018 | Jones | G07C 5/085 |

FOREIGN PATENT DOCUMENTS

| | | |
|---|---|---|
| CN | 105784272 A | 7/2016 |
| EP | 1026015 A2 | 8/2000 |
| JP | 2012201332 A | 10/2012 |

OTHER PUBLICATIONS

ATEQ Quickset TPMS Tool, ATEQ TPMS Light Reset Tool QuickSet, pp. 1-3. Website last visited Aug. 17, 2016.

OTC TPR Activation Tool, pp. 1-5. http://www.otctools.com/products/tpr-activation-tool. Website last visited Aug. 17, 2016.

* cited by examiner

METHOD AND DEVICE FOR REPROGRAMMING TPMS TIRE SENSOR DATA IN A VEHICLE CONTROL SYSTEM

CROSS-REFERENCE TO RELATED APPLICATIONS

This application claims priority benefit to U.S. Provisional Patent Application No. 62/443,943 filed Jan. 9, 2017 the entire contents of which is incorporated by reference.

TECHNICAL FIELD

This disclosure relates to vehicle tire pressure monitoring systems (TPMS) commonly, but not exclusively, used in passenger vehicles.

BACKGROUND

Tire pressure monitoring systems (TPMS) have been mandatory on passenger vehicles having pneumatic tires in the US and Europe for several years. TPMS systems generally consist of a TPMS sensor in the valve stem of a pneumatic tire which monitors various conditions of a tire, for example tire air pressure and temperature. In a fundamental mode of operation, if a measured tire air pressure drops below a predetermined value, the TPMS sensor will send a wireless signal which is received by the vehicle's electronic control unit (ECU), or other vehicle system, to alert a driver of the measured low tire air pressure before the tire is damaged and to maintain safe driving conditions.

Each TPMS tire sensor typically includes its own unique identification alphanumeric code so the vehicle ECU can distinguish between the typical four tires on a passenger vehicle and further alert a driver which vehicle tire may be experiencing conditions outside of an acceptable range.

When a modern passenger vehicle requires that a TPMS tire sensor be replaced, a new installed TPMS tire sensor typically includes a new and different identification (ID) to distinguish that TPMS tire sensor from the TPMS tire sensors in the other tires. In order for the vehicle ECU to recognize and be able to acknowledge signals from the new TPMS tire sensor, the ECU has to be updated or "re-learn" the new ID, and often also validates the other TPMS tire sensors, so it can effectively receive and decode the signals emitted from the new tire sensor and alert the driver to the present conditions.

In current TPMS systems, each TPMS tire sensor is capable of emitting a radio frequency (RF) signal including, but not limited to, data of its unique ID. TPMS tire sensors are typically "asleep" (non-signal emitting) to conserve internal battery life. When service or TPMS measurement is required, typically a low frequency (LF) signal is sent by a separate tool to the TPMS tire sensor to "awaken" the TPMS tire sensor and for the tire sensor to emit a RF data signal including its unique ID for receipt by the vehicle ECU or other TPMS diagnostic tool used by a technician.

Figure 1:
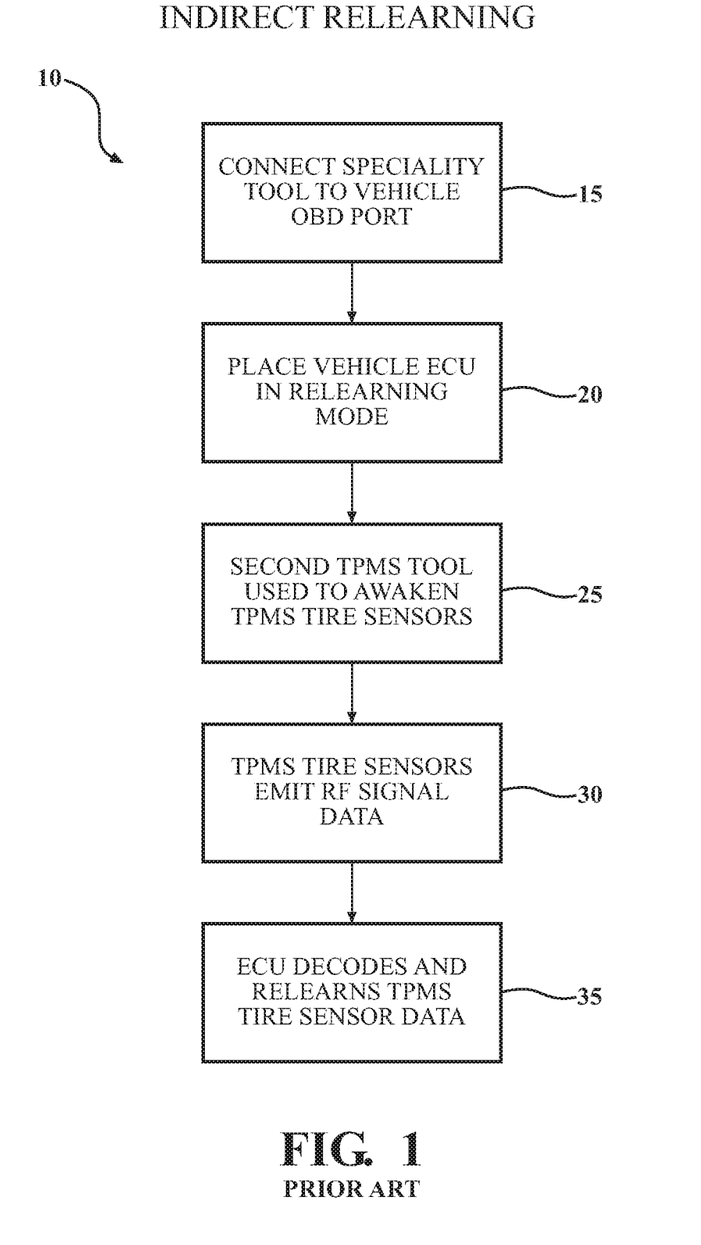
FIG. 1 is a flow chart of a prior art TPMS ECU "indirect" relearning process.

Referring to FIG. 1, prior ECU relearning methods typically employ what is considered an "indirect" relearning procedure or process 10 which includes the following general steps:

A. First, a specialty or specific/dedicated diagnostic tool is connected to a vehicle onboard diagnostic system (OBD II) port at 15 which includes a plug or port positioned under the instrument panel in the passenger compartment. The diagnostic tool is then placed in communication with the ECU through connection to the OBD II port.

B. Second, the vehicle ECU needs to be put into a learning mode at 20. In a common example, a series of vehicle functions are triggered in a specific sequence according to the specific vehicle's electronic system requirements for placing the ECU in a learning mode.

C. Once in learning mode, a second tool, typically a hand-held TPMS tool, is used by a technician to trigger or awaken each TPMS tire sensor at 25 by walking around the vehicle and placing the second tool close to each TPMS tire sensor.

D. Once awakened, each TPMS tire sensor emits an RF data signal, including the TPMS tire sensor unique identification (ID) code, at 30 which is received, decoded and stored as the vehicle current TPMS tire sensors in the ECU at 35.

In subsequent steps (not shown), the user closes the procedure on the specialty diagnostic tool and disconnects the diagnostic tool from the OBD port.

Figure 2:
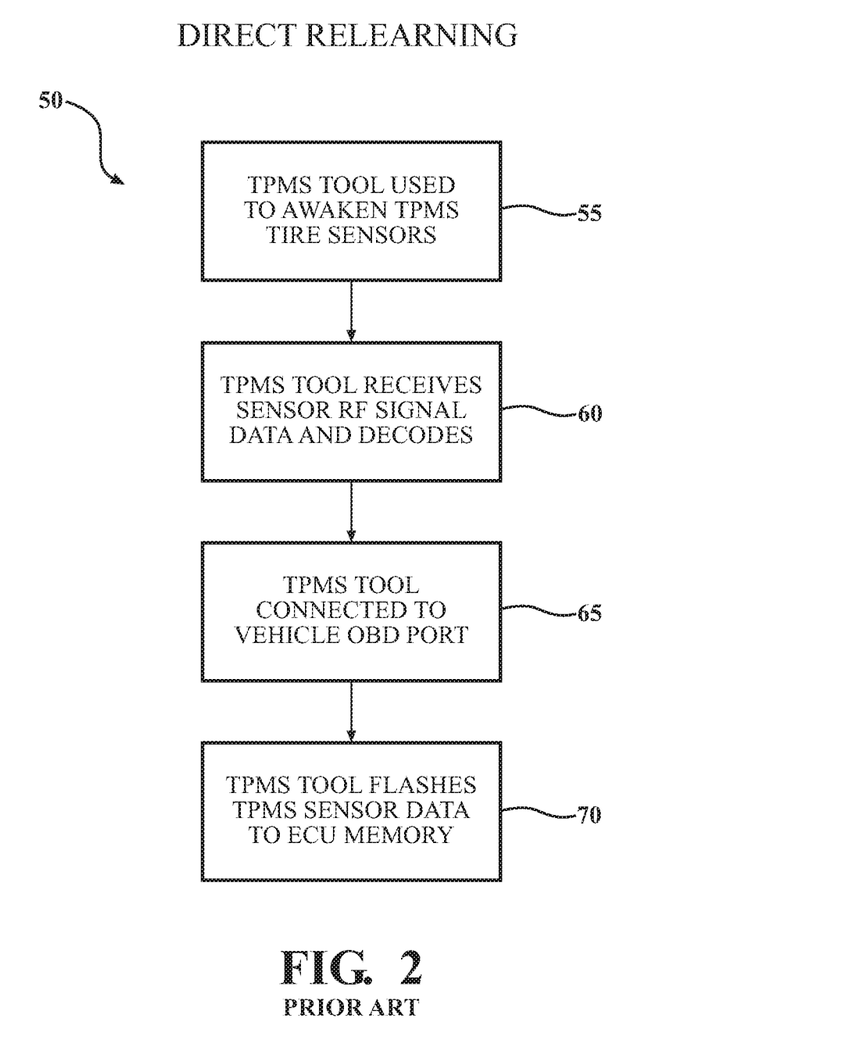
FIG. 2 is a flow chart of a prior art TPMS ECU "direct" relearning process.

Alternately as shown in FIG. 2, some other ECU TPMS relearning methods use what is considered "direct" relearning 50 including the following general procedure:

A. First, a TPMS hand-held tool is used to awaken the TPMS tire sensors at 55 by placing the tool near the TPMS tire sensor of each tire. Each TPMS tire sensor emits its RF data signal including its ID which is received, decoded and stored on the TPMS tool at 60.

B. The TPMS tool is then connected to the vehicle OBDII port at 65 and directly transfers, "writes", "burns" or "flashes" the received and stored TPMS tires sensor data to the ECU to register the new TPMS sensor IDs in the ECU at 70.

Typically, the TPMS tool in the "direct" method 50 does not place the ECU in learning mode unlike the "indirect" mode described above. The direct method transfers the data to the vehicle ECU for storage in the appropriate memory much like uploading and saving data to a computer hard drive.

The above "indirect" method 10 is generally preferred by original equipment vehicle manufactures (OEM's) because the TPMS tire sensor ID data is coming directly from the TPMS tire sensors themselves. However, the indirect method 10 requires two separate tools and takes anywhere between about 5-20 minutes for service technicians to set up the diagnostic equipment, place the ECU in learning mode, awaken the TPMS tire sensors and complete the re-learning or re-registering of the TPMS tire sensor IDs in the vehicle ECU.

It would be advantageous to improve on the prior TPMS relearning methods and devices to obtain the benefits of the preferred method and increase the ease and speed of the process.

BRIEF SUMMARY OF THE INVENTION

Disclosed herein are methods and devices for resetting or reprogramming TPMS tire sensor data in a vehicle control system, for example a vehicle electronic control unit (ECU). In one example, a single TPMS relearning tool is used to receive, store and selectively emit a simulated TPMS tire sensor data signal to an ECU to reprogram, reset, re-learn or re-register (collectively referred to as "re-learn" or "re-learning") updated TPMS tire sensor data in the ECU.

In one example, the single hand-held TPMS relearning tool is useful to awaken the TPMS tire sensors, receive a first TPMS tire sensor RF data signal including the tire sensor unique ID, and places the vehicle ECU in learning or relearning mode on connection to the vehicle OBD II. In one example, the TPMS relearning tool then generates a second TPMS tire sensor data signal simulating the received first TPMS tire sensor RF data signal and wirelessly transmits the second TPMS tire sensor RF data signal from the TPMS tool transmitter to the ECU to reset the TPMS tire sensor data/information in the ECU in a manner similar to if the TPMS tire sensors were emitting the tire sensor RF data directly to the ECU.

The present process and device achieves the advantages of the indirect relearning process as the ECU is receiving the tire sensor RF data as emitted by the sensors and only requires a single tool to awaken and place the ECU in a learning or relearning mode.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 3:
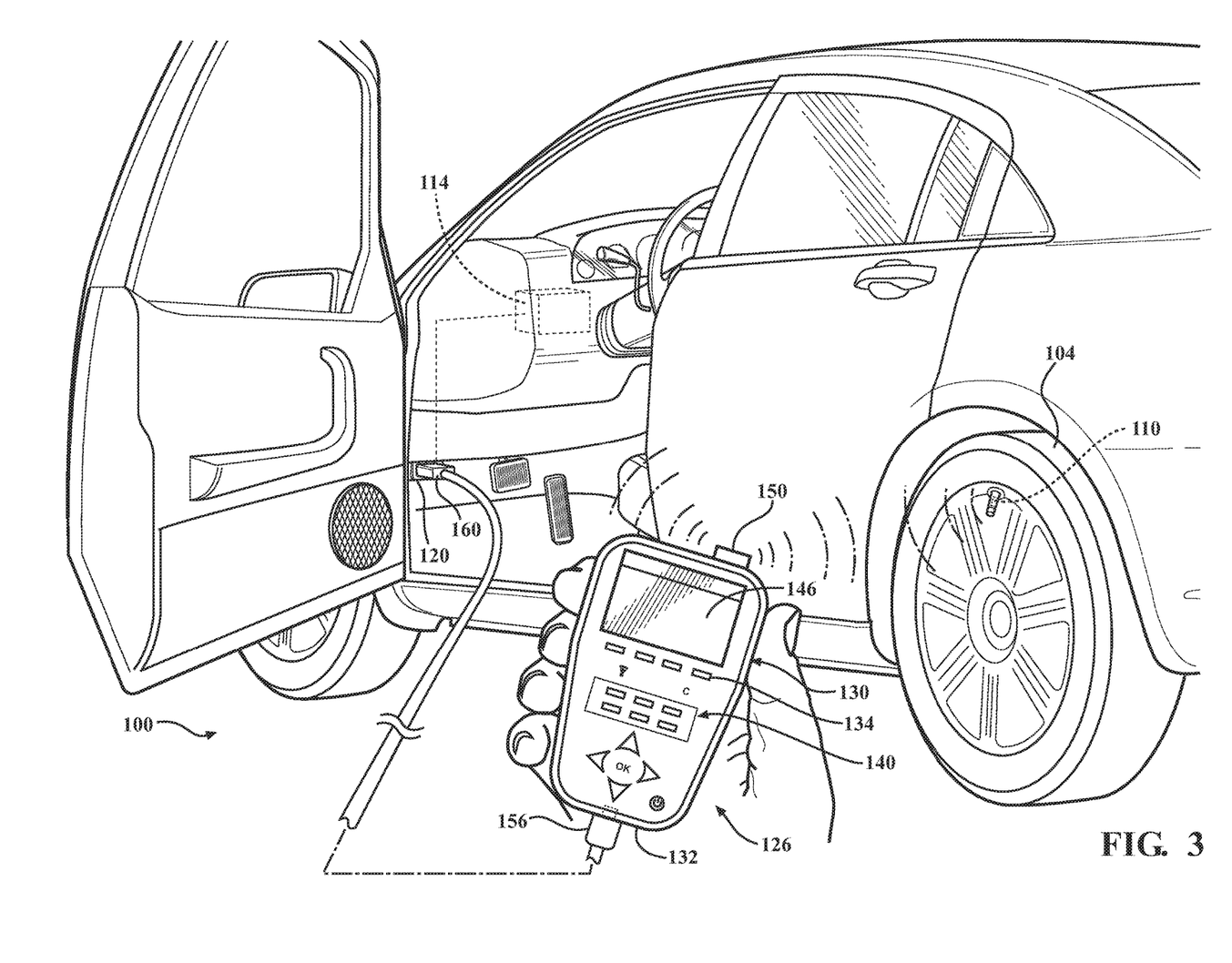
FIG. 3 is a schematic of an example of a TPMS tire sensor RF simulation device of the present invention.
Figure 4:
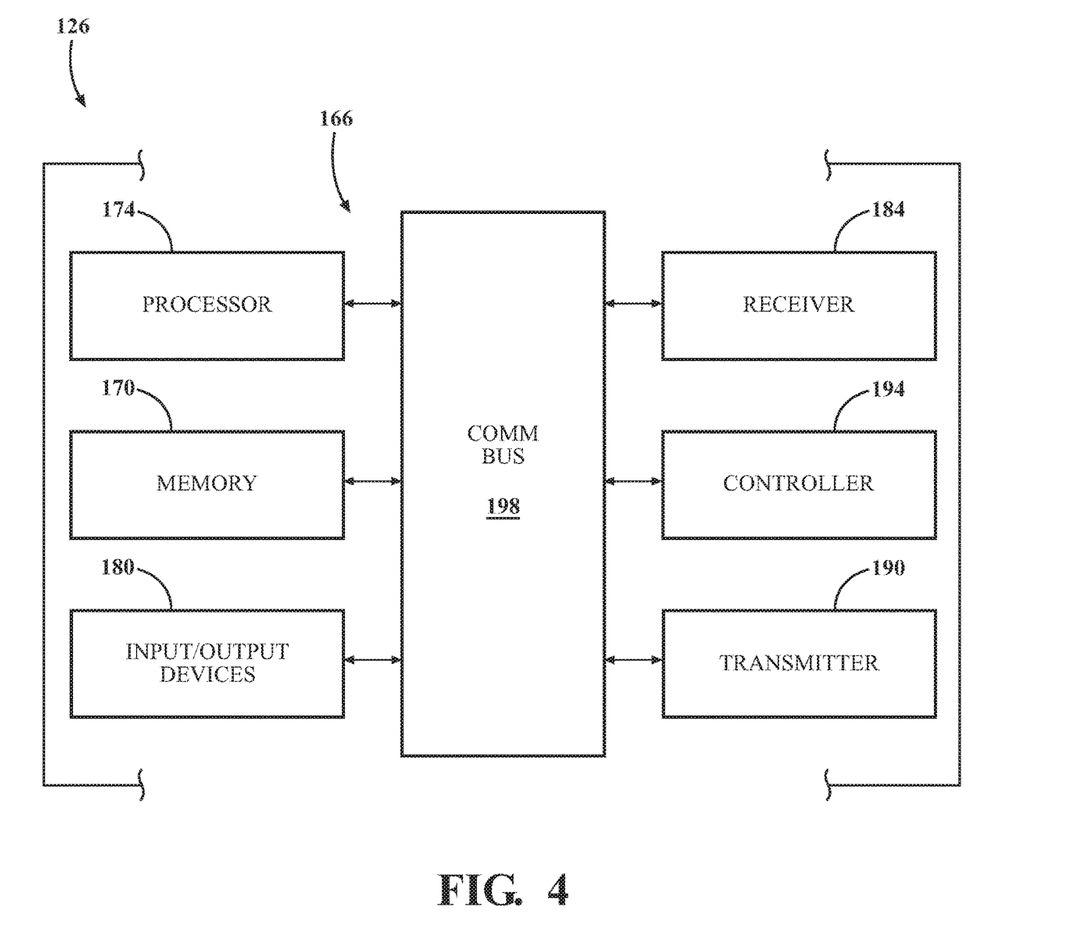
FIG. 4 is a schematic of an example of control system for the example device in FIG. 3.
Figure 5:
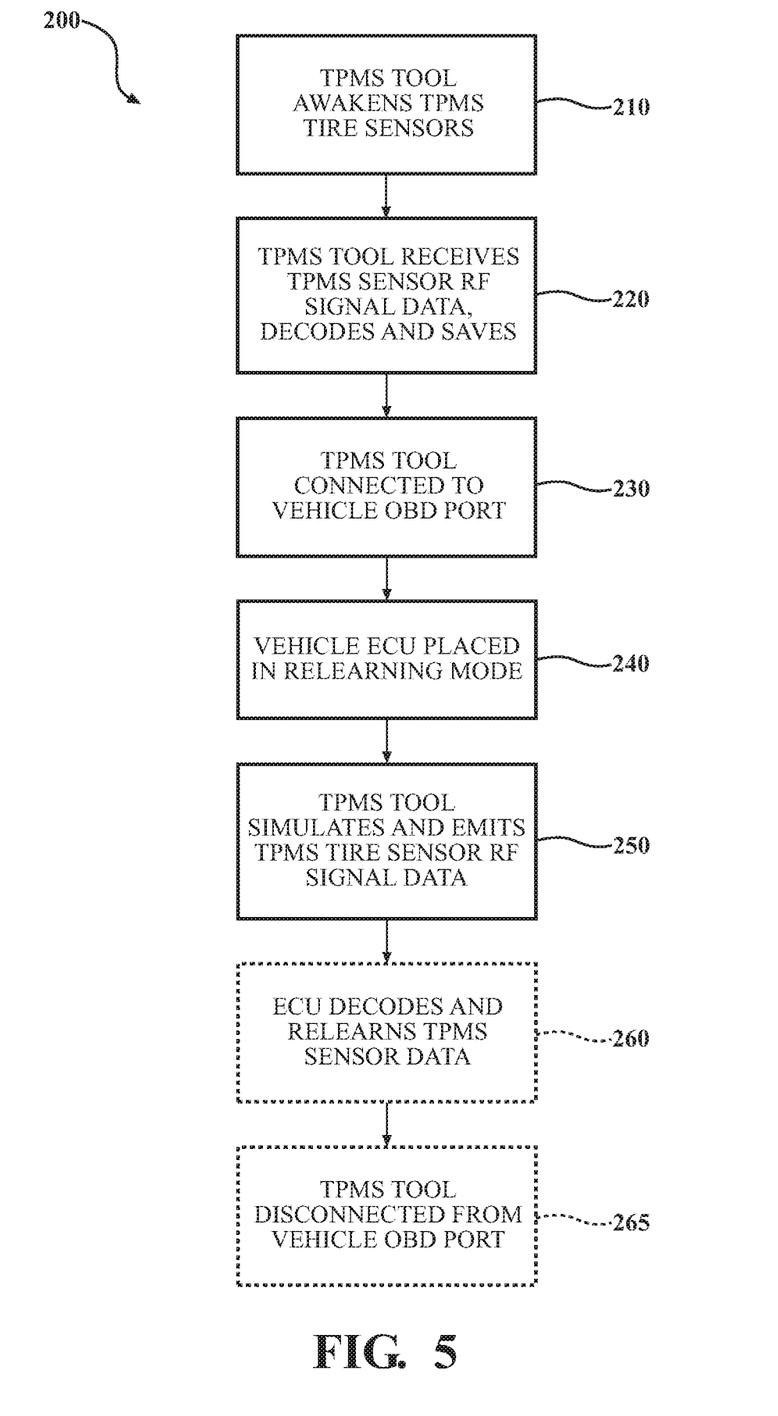
FIG. 5 is a flow chart of an example of a method for re-learning TPMS tire sensor RF data signal information by a vehicle ECU using an exemplary RF data signal simulation device of FIG. 3

Referring to FIGS. 3-5, examples of a device 100 and method 200 for resetting TPMS tire sensor data in a vehicle control system are shown. The described systems 100 and methods 200 receive TPMS tire sensor data from TPMS tire sensors and subsequently simulate and emit as a second TPMS tire sensor data signal the first tire sensor data signal to a vehicle control system such as an electronic control unit (ECU) so the ECU re-learns the updated TPMS tire sensor data for future use by the vehicle. FIGS. 1 and 2 show general examples of prior art re-learning processes as described above.

Referring to the example in FIG. 3, a system 100 for resetting TPMS tire sensor data in a vehicle control system is shown. In the example, a single TPMS relearning device 126 is shown in use with a vehicle having pneumatic tires 104 (only two tires 104 shown for convenience) each having a tire pressure monitoring system (TPMS) tire sensor 110. Tire sensor 110 can be a conventional TPMS tire sensor mounted on the valve stem of a tire placing the sensor in fluid communication with the air pressure inside the tire and sealed by the tire rim. The system 100 is useful on all vehicles having TPMS and other products having an interior air volume which may be monitored for one or more conditions, for example, air pressure, temperature and other conditions known by those skilled in the art.

In use with a modern passenger vehicle, system 100 is adapted to operate with a vehicle electronic control unit (ECU) 114 onboard the vehicle and in communication with other vehicle systems including safety systems such as instrument panel alert indicators and vehicle onboard diagnostic systems (OBD). In one example, the vehicle OBD includes an OBD II port 120 which allows connection of external devices to interface and communicate with the OBD and ECU systems of the vehicle. It is understood that device 100 and method 200 may interact and communicate with additional systems on the vehicle as known by those skilled in the art.

Still referring to the exemplary system 100 in FIG. 3, system 100 includes a TPMS relearning tool 126 which is selectively placed or adapted to communicate with the TPMS tire sensors 110 and vehicle ECU 114 as described below. In the example, tool 126 is a portable, hand-held device having a housing 130 including a bottom 132, function buttons 134, an input keypad 140, a visual display 146 and an antenna 150 for sending and receiving electronic and digital wireless signals and/or data to and from sources, for example, the TPMS tire sensors 110 and ECU 114 as generally shown. It is understood that other devices, including different hardware and software and/or different individual components and configurations making up the tool 126 known by those skilled in the art may be used. It is further understood that tool 126 may be a permanent or semi-permanent device (not shown) which is positioned in a service garage bay where a vehicle is selectively positioned in close proximity to the tool 126 providing for communication between the tool, the sensors 110 and ECU 114.

In the example TPMS relearning tool 126, an OBD cable or cord 156 is selectively connected to a communication port on the bottom of tool 126 allowing transfer of electronic and/or digital communications, signals and/or data/information to and from the tool 126 through cable 156. In one example, electrical power may also be transferred to the tool 126 through cable 156. Alternately, tool 126 may be powered by rechargeable or disposable batteries. In one aspect, cable 156 includes a plug or adaptor 160 for connection to a vehicle OBD II port 120 which is in communication with the ECU 114 and other vehicle systems as known by those skilled in the art. When cable 156 is connected to tool 126 and to the OBD II port 120, the TPMS tool 126 can send and receive signals and data to and from the ECU 114 and other vehicle systems connected thereto. It is understood that different hardware, connection methods and methods of communication between the TPMS relearning tool 126, the tire sensors 110 and the ECU 114 or other vehicle systems known by those skilled in the art may be used. For example, transfer and/or communication of signals and data through cable 156 described above can alternately be made wirelessly through known wireless communication protocols for TPMS and other electronic devices known by those skilled in the art.

Referring to FIG. 4 an example of a control system 166 for TPMS relearning tool 126 is generally shown. In the example, control system 166 includes a conventional memory storage device 170 which may include conventional permanent (read only memory, ROM) and/or non-permanent data memory storage devices (random access memory, RAM) on a medium for storing and recalling digital data, software programs, operating systems, executable instructions and other information known by those skilled in the art. Examples of storage devices and media include a hard disk drive, solid state drive and other temporary and permanent memory data storage devices known by those skilled in the art.

Exemplary control system 166 further includes a conventional microprocessor 174 for processing executable instructions, manipulating information, making calculations and/or other functions known by those skilled in the art. Also shown by example are input/output device port(s) 180 for use with, for example, external devices which may be connected to the relearning tool 126 and placed in communication with the control system 166 to send and receive data, information, power and other signals.

Exemplary control system 166 further includes a receiver 184 which is adapted or operable to detect and collect electronic signals, digital signals, and other signals either through wired connections or through wireless communication, for example from the TPMS tire sensors 110 and ECU 114. In one example, receiver 184 is in communication with antenna 150 on relearning tool 126 as generally shown in FIG. 3. In one aspect described further below, receiver 184 receives radio frequency (RF) data signals from the TPMS tire sensors 110 when the TPMS tire sensors 110 are activated as described above. Conventional TPMS tire sensors 110 transmit RF signals including sensor ID and other information at a frequency between 314-434.2 Megahertz (MHz). The tool 126 then communicates that data to the tool 126 processor 174 for decoding the received tire sensor signal data according to preprogrammed signal decoding instructions stored in the memory storage device 170. The decoded tire sensor 110 data is temporarily stored in memory 170 pending emission by the tool 126 of a second TPMS tire sensor data signal which simulates the received TPMS tire sensor data signal from the TPMS tire sensors 110. The TPMS relearning tool 126 thereafter sends the second or simulated TPMS tire sensor data signal to the ECU 114 as further described below.

Exemplary system 100 control system 166 further includes a transmitter 190 which is adapted or operable to wirelessly emit signals to, for example, activate or awaken TPMS tire sensors 110 as described above. A common activation frequency signal used to activate TPMS tire sensors 110 is in a low frequency (LF), for example, 125 KHz (kilohertz). In one example, the transmitter 190 is in communication with the antenna 150 to focus and direct the emission and/or transfer of data signals from the tool 126. In one aspect, a transceiver-type device (not shown) is used which functions both as a receiver and a transmitter for receiving and emitting wireless signals respectively. It is understood that tool 126, tire sensors 110 and the vehicle control systems may receive and emit/transmit signals having alternate frequencies, carrying additional or alternate data/information and having different characteristics known by those skilled in the art.

Exemplary control system 166 also includes a control module 194 to direct, coordinate and sequence functions and other operations of the control system 166 and its components according to preprogrammed instructions based on predetermined features, functions and operations of relearning tool 126 and system 100. The above control system 166 exemplary components are in one aspect connected to a communication bus 198 allowing communication between some or all of the above control system 166 components. Other devices for the selective or open communication between the above control system components known by those skilled in the art may be used. It is further understood that alternate or additional control system 166 hardware, software and/or operating systems known by those skilled in the art may be used.

Referring to FIG. 5, an example of a method 200 for re-setting or re-learning TPMS tire sensor 110 data in a vehicle control system using a single TPMS relearning tool 126 is shown. In an exemplary application for system 100 and method 200, a TPMS-equipped passenger vehicle is delivered to a service garage and a TPMS tire sensor 110 requires replacing. In a common instance, a new TPMS tire sensor 110 requires replacement in a pneumatic tire 104. In the example, the new TPMS tire sensor 110 includes a unique ID which is different than the ID of the TPMS tire sensor that requires replacement. In this example, the re-learning of the new TPMS tire sensor 110 unique ID would be required in order for the vehicle TPMS system to function properly.

Alternately, where the new TPMS sensor is a programmable TPMS sensor, either: (a) a new TPMS tire sensor unique ID is generated and stored/saved in the new programmable TPMS tire sensor, or (b) the new programmable TPMS tire sensor is programmed with the damaged/replaced tire sensor ID already known to, or stored by, the ECU. In the example (a), the ECU would need to be updated with, or re-learn, the newly generated TPMS tire sensor ID. In the example (b), the ECU may not need to be updated or calibrated since the replaced tire sensor ID is being used by the new tire sensor. It is further understood that applications other than passenger vehicles are contemplated for system 100 and method 200. For example, the system 100 and method 200 may be used on motorcycles; bicycles; aircraft; residential, industrial, farming, marine and construction equipment; as well as other machines or devices which employ pressurized air volumes which benefit from monitoring air pressure and other metrics.

Referring to FIGS. 3 and 5, in exemplary first step 210, a portable, hand-held TPMS relearning tool 126 is first used to "awaken" or activate each TPMS tire sensor 110 and retrieve predetermined information from the TPMS tire sensor 110. In one aspect of the method, the user/technician selects the appropriate tool function on the tool 126 through a menu option generated by a preprogrammed user interface on tool display 146. In one example, the user would press a function button 134 or the keypad 140 to wirelessly send a low frequency (LF), for example 125 KHz, requisition or activation signal to a selected vehicle TPMS tire sensor 110 through transmitter 190 and antenna 150 in the manner previously described. In common practice, the activation signal is sent by the tool 126 when the tool 126 is placed in close proximity to a first selected tire sensor 110. As explained, the tire sensor 110 may be in many other types of pressurized air volume devices other than tires.

On activation by the tool 126 activation signal, each TPMS tire sensor 110 then emits or sends a preprogrammed or predetermined first TPMS tire sensor RF data signal described above which is received by the tool 126 through the tool receiver 184 as generally described above. In one example, the tire sensor 110 generates the first TPMS tire sensor data signal as a RF 433 MHz Modulated, Manchester coded signal having sensor data embedded in the carrier wave. The first TPMS tire sensor 110 RF data signal typically has data including the sensor ID, tire air pressure, temperature, battery condition or life, accelerometer and/or other metrics monitored and stored in the sensor 110. Other forms of encoded signals transmitted by the TPMS tire sensors may be used as known by those skilled in the art. Examples of conventional hand-held TPMS diagnostic tools that generate and send the described TPMS tire sensor 110 LF activation signal to TPMS tire sensors 110, and thereafter receive and decode the first TPMS tire sensor 110 RF return data signals for use by a user described above include the VT 36, VT 55 and VT56 TPMS tools manufactured by assignee of the present application, ATEQ, and described at ateq-tpms.com, the entire contents of which are incorporated herein by reference. Other hand-held, portable, moveable or stationary TPMS devices which can send signals to trigger or activate TPMS tire sensors to communicate with TPMS diagnostic or relearning tools may be used.

In exemplary step 220, on receipt of the first tire sensor 110 RF data signal, for example including the tire sensor unique identification (ID), relearning tool 126 decodes the received first tire sensor 110 data signal by processor 174 through preprogrammed software and executable instructions stored in tool 126 memory 170. One or more decoding programs and protocols may be used depending on the RF data signals emitted by the different TPMS tire sensor 110 manufacturers.

In one example, tool 126 control system 166 will then separately store in a data memory storage device 170 each separately received and decoded first TPMS tire sensor data signal data/information received from each TPMS tire sensor 110. Alternately, the received tire sensor RF data signal may be stored or recorded, with or without further decoding/encoding, through another process and/or on other recordable and retrievable storage media as known by those skilled in the art. It is also understood that the emitted tire sensor 110 RF data signal may contain other information, alternately, or in addition to, the TPMS tire sensor unique ID as explained above.

In exemplary step 230, the same or single TPMS relearning tool 126 is used to place the vehicle ECU 114 in a learning/relearning mode to receive and store in ECU data memory media the new TPMS sensor ID and other predetermined information emitted by the tire sensor 110 and received and stored in memory by the tool 126 as described. In one example of initiating or placing the vehicle ECU or control system in a relearning mode, an accessory cable 156 is used to connect TPMS relearning tool 126 to the OBD II port 120 of the vehicle to establish hardline communication with the vehicle ECU 114. A suitable cable 156 and adapter 160 is described in U.S. Pat. No. 9,050,862 B2 the entire contents of which is incorporated by reference. Other wires, cables, harnesses or other methods known by those skilled in the art may be used. The exemplary cable 156 includes a connector adapted or operable to connect to a data communication port on the tool 126, for example a USB port. On an opposing end of the cable 156 is a connector suitable for connection to the OBD II port 120 of the vehicle. The OBD II port 120 is in electronic communication with the vehicle ECU 114 and other vehicle systems. The tool 126 communication port is schematically shown as 180 in FIG. 4.

It is understood that other devices and methods for connecting tool 126 to the OBD II port 120 and/or establishing communication between tool 126 and the ECU 114 may be used. For example, wireless communication between the tool 126 and a module (not shown) which plugs into the OBD II port 120 may be used. Through known wireless protocols, the tool 126 may wirelessly communicate with the module connected to the OBD II port to place the ECU in relearning mode. Other devices, methods and configurations for communication between relearning tool 126 and the OBD II port 120 and/or directly with the ECU 114 known by those skilled in the art may be used.

Still referring to FIG. 5, exemplary method step 240 includes placing the vehicle ECU 114 in a learning or relearning mode to receive the simulated tire sensor 110 RF data signal, for example including the tire sensor 110 ID, from the tool 126 as explained further below. In one aspect, the relearning tool 126 includes preprogrammed and stored in memory 170 instructions which instruct, prompt and/or initiate a sequence for the vehicle ECU 114 to enter into a learning or relearning mode to accept and store information communicated to ECU 114, for example TPMS tire sensor 110 information from tool 126.

In one example, a user will select from a tool 126 menu structure displayed on visual display 146 an option to place the vehicle ECU 114 in a learning mode. On activation of the menu selection, tool 126 will recall from memory 170 instructions in a protocol suitable for the particular vehicle and send the instruction data through cable 156 through the OBD II port 120 to the ECU 114. As noted in the Background section, prior devices often required a first or special/dedicated tool, separate from a second tool used to awaken the TPMS sensors, that connects to the OBD II port to place the vehicle in a relearning mode. In the present invention, use of the single TPMS tool 126 for both of these actions or functions (placing ECU in relearning mode and activation of the TPMS tire sensors 110 to transfer the tire sensor 110 information) is highly advantageous and more time efficient over prior devices and processes. This is further advantageous as the user/operator need only learn one process because from the user's perspective, the process is essentially the same whether a direct or indirect relearn process described above is used.

On recognition through the tool 126, and/or as perceived by the user technician through visual or audible signals from the vehicle, that the vehicle ECU 114 is in relearning mode, exemplary step 250 includes the TPMS relearning tool 126 simulating and wirelessly emitting the previously received and stored TPMS sensor 110 RF data signals to the ECU 114 to re-learn or reset the new tire sensor 110 IDs, and commonly all of the tire sensor 110 IDs whether new or existing. It is understood that tool 126 may transmit additional or other TPMS sensor 110 information and/or data, as well as non-TPMS information and/or data, to the vehicle ECU 114.

In one aspect of step 250, once the ECU is in a relearning mode, a user will select a function from a tool 126 user interface to recall from memory 170 and emit the previously stored in memory 170 TPMS tire sensor 110 data signals to the ECU 114. Alternately, the user will be prompted to connect the OBDII connector and press an accept or "OK" button or icon like the direct relearn method. On activation of this function, the relearning tool 126 will recall each of the TPMS tire sensor 110 data signals stored in memory 170 and execute through controller 194 preprogrammed instructions to wirelessly emit the tire sensor 110 data signals.

In one example of step 250, prior to the simulated tire sensor 110 RF data signal emission from the tool 126, the tool 126 control system 166 and processor 174 will generate a second TPMS tire sensor data signal to simulate the first or original TPMS tire sensor data signal received from the tire sensors 110 following activation by the TPMS relearning tool 126. In one example, the stored in memory TPMS tire sensor data signal and/or data/information will be retrieved from the data memory storage device 170 and recoded/encoded by processor 174 and controller 194 to a signal communication form, frequency and/or data protocol suitable for wireless emission and for receipt and processing by the particular vehicle ECU 114. For example, encoding information and/or data may be added to the stored in memory 170 tire sensor 110 data/information by the tool control system 166 before the simulated second TPMS tire sensor data signal is emitted by the tool 126 so the particular vehicle ECU 114 can readily receive, recognize, store and use the simulated tire sensor 110 RF data signals emitted by relearning tool 126. The information and instructions for the tire sensor 110 RF data signal recoding/encoding are predetermined and stored in the tool 126 memory 170. For example, a technician may select from a tool 126 stored database, or manually input, the vehicle make, model and year into tool 126. Data organized in a database stored in tool memory 170, or local computer or server in communication with the tool 126, will identify which communication and/or data protocol the particular vehicle ECU 114 will accept. Tool 126 then can recode/encode and/or format the previously received and stored tire sensor 110 data/information or signal to the proper format and/or communication protocol prior to wireless emission by the tool 126 to the ECU 114 explained below. Alternately, on connection of tool 126 to the OBD II port 120, the tool 126 may receive or retrieve information from the ECU, or other vehicle systems, sufficient for the tool 126 to identify the make, model, year of the vehicle and then determine the proper communication form and protocol to emit the tire sensor 110 data signals to the ECU in a format the ECU can recognize, store and further execute vehicle functions. It is understood that other processing of the previously received and/or recorded tire sensor 110 RF data signals may occur prior to emission by tool 126 as known by those skilled in the art.

In the example step 250, on tool 126 activation of the simulation and emission function, and any further processing such as recoding/encoding described above, the relearning tool 126 wirelessly emits the simulated second TPMS tire sensor 110 RF data signal(s) to the ECU 114 so the ECU 114 can re-learn or register the new, and possibly the other existing, TPMS tire sensors 110 IDs which have been installed on the vehicle. In one aspect, the tool 126 simulation and/or emission function will recall the stored tire sensor 110 data signals from memory 170 as described above and wirelessly emit or otherwise send the generated simulated second tire sensor 110 data signals through the tool transmitter 190 to the ECU 114. In one example, the control system 166 will access and sequentially send each of the individual tire sensor 110 RF data signals (a common passenger car will have four signals, one for each of the four wheels including a TPMS tire sensor 110) to the ECU in four separate, but closely spaced in time, signals. The same process would be used if the vehicle has a spare tire including a TPMS tire sensor 110.

In the described examples, the first TPMS tire sensor 110 RF signals received from the tire sensors 110 are simulated in the sense that the tool 126 has originally received them directly from each TPMS tire sensor 110. In the examples given, the exemplary relearning tool 126 and process 200 preferably decodes the tire sensor 110 RF data signal and/or information, stores or records the data signal and/or information in tool 126 data memory storage 170 until needed. On activation of the tool 126 by the user, and having placed the vehicle control system, for example the ECU, in relearning mode described above, the tool controller 194 and processor generates a second TPMS tire sensor data signal which preferably recreates or substantially simulates, the first or original TPMS tire sensor data signal received from the tire sensors 110. As described, the relearning tool 126 retrieves the stored data signal and/or data information for each tire sensor 110 from memory 170, recodes/encodes the tire sensor data signal or data/information in a suitable form for transfer and recognition/understanding by the ECU 114 and transmits/emits the simulated second TPMS tire sensor 110 RF data signal for receipt and use by the vehicle ECU or vehicle control system.

The simulated second TPMS tire sensor 110 RF signal retrieved from memory storage 170 and emitted from the tool 126 is intended to simulate or be the effective equivalent to the first TPMS tire sensor 110 data signals, preferably in the radio frequency signal wave described above, including the respective TPMS tire sensor ID, originally emitted from the TPMS tire sensors 110 when the tool 126 activated or requisitioned the information from the TPMS tire sensors 110. This simulated second TPMS tire sensor 110 RF signal would also be the same or equivalent to the tire sensor RF signal requisitioned or retrieved by conventional tools and processes in the TPMS indirect relearning procedure discussed in the Background section.

In an alternate example of the simulated second TPMS tire sensor data signal, the relearning tool effectively simply records or otherwise stores the received first TPMS tire sensor data signal and then re-emits or "replays" the received first TPMS tire sensor data signal as the simulated second TPMS tire sensor data signal. In this alternate example, the tool 126 preferably does not electronically generate or create a distinct second TPMS tire sensor data signal to simulate the first TPMS tire sensor signal as the first TPMS tire sensor signal is being used or replayed/re-emitted. It is understood that encoding, decoding or other processing may occur in order to record/store and/or re-emit the first TPMS tire sensor data signal as the simulated second TPMS tire sensor data signal. In one example, from the vehicle control system or ECU's perspective, the second TPMS tire sensor data signal or the simulated second TPMS tire sensor data signal is effectively identical to the first TPMS tire sensor data signal as emitted by the tire sensor 110. In alternate examples, the simulated second TPMS tire sensor data signal is substantially the same in data/information and protocol/format so as to be received and processed by the vehicle control system or ECU as if received in the first instance from the TPMS tire sensors 110 directly. Variations in the content, composition, format and transmission protocols of the simulated second TPMS tire sensor data signal, and the data within, to achieve the features, functions and advantages discussed herein may be used as known by those skilled in the art.

It is understood that other methods and components for receiving, storing or otherwise recording in data memory storage, simulating and emitting the TPMS tire sensor RF data signal may be used as known by those skilled in the art.

In an exemplary and optional step 260 (shown in dashed line), the ECU 114 will receive each of the second or second simulated and transmitted TPMS tire sensor 110 RF data signals from relearning tool 126 and store the received second or second simulated tire sensor data signals or data/information in a memory storage device medium for use by the vehicle to communicate with the TPMS sensors 110 as described above. In the example, due to the decoding and recoding/encoding by the TPMS relearning tool 126 as described, the ECU-received simulated second TPMS sensor RF data signals are in a form readily received by the ECU in the particular vehicle preferably by manufacturer and/or model type. In exemplary optional step 265 (shown in dashed lines), the TPMS tool 126 is disconnected from the vehicle OBD port.

In an alternate example (not shown), the device 100 and methods 200 are used with a wireless OBDII connector allowing communication between the tool and the OBD II port 120 without cable 156.

In an alternate application, although systems 100 and methods 200 have been described as useful for reprogramming or resetting TPMS tire sensor data in a TPMS repair or replacement setting, systems 100 and methods 200 are also useful in other applications, for example, initially programming a vehicle control system when the vehicle is manufactured. As mentioned, the applications of the present invention are not limited to passenger vehicles, but have many applications including other devices or products having pressurized air volumes wherein wireless sensors are used to monitor air pressure and other metrics.

The present exemplary system 100 and methods 200 described herein provide numerous and significant advantages over the prior conventional TPMS direct and indirect relearning devices and processes described in the Background section. The system 100 and exemplary accessory cable 156 allows for a single relearning tool 126 device to both (a) awaken and receive the tire sensor 110 RF data signals from the TPMS tire sensors 110, and (b) initiate the vehicle ECU to enter into a learning or relearning mode to receive updated information and data from the TPMS tire sensors, for example a new TPMS tire sensor 110 that replaced a defective one, from the tool 126. As explained, additional or alternate information may also be transmitted by the tool 126 for receipt and use by the ECU 114.

The present exemplary systems 100 and methods 200 provide the further advantage of single tool 126 (a) placing the vehicle control system or ECU in a learning or relearning mode, and (b) sending the ECU a simulated or equivalent second TPMS tire sensor RF data signal as if the ECU were receiving the TPMS tire sensor RF data signals directly from the TPMS tire sensors 110 as preferred by original equipment auto manufacturers.

The present invention systems 100 and methods 200 thereby achieve the benefits of (a) using a single tool 126 for the entire relearning process, (b) placing the vehicle in relearning mode preferred by most original equipment vehicle manufacturers, and (c) wirelessly providing/emitting and/or sending the ECU RF data signals that simulate TPMS tire sensor 110 data signals as if the TPMS tire sensor RF data signals had been emitted directly from the TPMS tire sensors 110. Further, the present devices 100 and methods 200 remove disadvantages in the prior TPMS indirect and direct relearning devices and processes which required two tool devices (indirect method) and/or that didn't place the vehicle in a relearning mode, but rather simply "flashed" or transferred tire sensor data to the ECU for storage and use by the ECU as described above. Other benefits and advantages of exemplary systems 100 and methods 200 known by those skilled in the art are further achieved.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for setting or resetting tire pressure monitoring system (TPMS) tire sensor data in a vehicle control system through use of a single TPMS relearning tool, the method comprising the steps of:
   sending a signal by a single TPMS relearning tool to a TPMS tire sensor for the TPMS tire sensor to emit a first TPMS tire sensor data signal including a TPMS tire sensor identification (ID);
   receiving the emitted first TPMS tire sensor data signal by the TPMS relearning tool;
   storing in a data memory storage device positioned in the TPMS relearning tool the received first TPMS tire sensor data signal;
   electronically engaging a portable communication cable to the TPMS relearning tool and a vehicle onboard diagnostic (OBD) port, the OBD port connected to and in electronic communication with the vehicle control system thereby establishing a hardline data communication between the TPMS relearning tool for receipt of information data from and sending information data to the vehicle control system;
   receiving by and through use of the single TPMS relearning tool vehicle information to identify a particular vehicle make, vehicle model and vehicle year from the vehicle control system through the communication cable;
   placing the vehicle control system in a relearning mode; and
   emitting from the TPMS relearning tool a second TPMS tire sensor data signal including the TPMS tire sensor ID to the vehicle control system wherein the vehicle control system TPMS one of sets or resets with the second TPMS tire sensor data signal including the TPMS tire sensor ID.

2. The method of claim 1 wherein emitting the second TPMS tire sensor data signal further comprises the step of:
   the TPMS relearning tool generating the second TPMS tire sensor data signal to simulate the first TPMS tire sensor data signal, wherein the TPMS relearning tool thereafter emits the simulated second TPMS tire sensor data signal to the vehicle control system.

3. The method of claim 2 wherein the step of simulating the first TPMS tire sensor data signal further comprises:
   recalling the stored TPMS tire sensor data from the data memory storage device prior to emitting the simulated second TPMS tire sensor data signal to the vehicle control system.

4. The method of claim 3 wherein the step of simulating the first TPMS tire sensor data signal further comprises:
   decoding the received first TPMS tire sensor data signal from the TPMS tire sensor prior to storage of the TPMS tire sensor data in the data memory storage device; and
   encoding the TPMS tire sensor data stored in the data memory storage device prior to emitting the simulated second TPMS tire sensor data signal to the vehicle control system.

5. The method of claim 1 further comprising the step of:
   confirming by the TPMS relearning tool that the vehicle control system is in the relearning mode prior to the TPMS relearning tool emitting the second TPMS tire sensor data signal to the vehicle control system.

6. The method of claim 2 wherein the vehicle control system comprises an electronic control unit (ECU).

7. A single tire pressure monitoring system (TPMS) relearning tool for use in setting or resetting TPMS tire sensor data in a vehicle control system, the relearning tool comprising:
   a housing including a user interface having a function input device and a visual display device;

a relearning tool control system positioned in the housing comprising:
a controller;
a data memory storage device;
preprogrammed sensor instructions stored in the data memory storage device, the preprogrammed sensor instructions operable to activate a TPMS tire sensor to emit a first TPMS tire sensor data signal including a TPMS tire sensor identification (ID);
preprogrammed vehicle instructions stored in the data memory storage device, the preprogrammed vehicle instructions operable to initiate the vehicle control system to change into a relearning mode;
a transmitter in communication with the controller, the transmitter selectively operable to transmit a TPMS tire sensor activation signal including the preprogrammed sensor instructions;
a receiver in communication with the controller, the receiver operable to receive the first TPMS tire sensor data signal emitted from the TPMS tire sensor;
a data communication port in communication with the controller; and
a microprocessor;
a communication cable selectively connected to the relearning tool data communication port and a vehicle onboard diagnostic (OBD) port in electronic communication with the vehicle control system, the single relearning tool control system operable to retrieve vehicle information data directly from the vehicle control system through the communication cable comprising a make, model and year of the vehicle, wherein the single relearning tool transmitter is further operable to selectively send a second TPMS tire sensor data signal including the tire sensor ID to the vehicle control system, wherein the vehicle control system one of sets or resets to the second TPMS tire sensor data signal tire sensor ID.

8. The tool of claim 7 wherein the microprocessor is operable to generate the second TPMS tire sensor data signal to simulate the first TPMS tire sensor data signal including the tire sensor ID for transmission of the simulated second TPMS tire sensor data signal to the vehicle control system.

9. The tool of claim 8 wherein the tool control system is operable to store the received first tire sensor data signal in the data memory storage device and further operable to recall the stored first TPMS tire sensor data signal from the data memory storage device.

10. The tool of claim 9 wherein the tool control system is operable to decode the received first TPMS tire sensor data signal prior to storing tire sensor data embedded in the received first TPMS tire sensor data signal, the tool control system further operable to encode the recalled from the data memory storage device TPMS tire sensor data, the recalled and encoded tire sensor data defining the simulated second TPMS tire sensor data signal transmitted to the vehicle control system.

11. The method of claim 1, wherein the step of emitting the second TPMS tire sensor data signal further comprises wirelessly emitting the second TPMS tire sensor data signal from the relearning tool for receipt by the vehicle control system while the relearning tool is engaged to the OBD port by the communication cable.

12. The method of claim 4 wherein on engaging of the communication cable to the OBD port, the method further comprising:
determining by the single relearning tool the encoding for the simulated second TPMS tire sensor data signal for the identified vehicle make, vehicle model and vehicle year using the received vehicle control system vehicle information.

13. The method of claim 12 wherein the received vehicle information through the engaged communication cable comprises the vehicle manufacturer, the vehicle model and the vehicle year.

14. The tool of claim 7 wherein the tool controller is further operable to selectively send a signal including the preprogrammed vehicle instructions for initiating the vehicle control system to change into the relearning mode through the data communication port and the communication cable to the vehicle control system.

15. A method for setting or resetting tire pressure monitoring system (TPMS) tire sensor data in a vehicle control system through use of a single TPMS relearning tool, the method comprising the steps of:
sending a signal by a single TPMS relearning tool to a TPMS tire sensor for the TPMS tire sensor to emit a first TPMS tire sensor data signal including a TPMS tire sensor identification (ID);
receiving the emitted first TPMS tire sensor data signal by the single TPMS relearning tool;
engaging a communication cable to the single TPMS relearning tool and a vehicle onboard diagnostic (OBD) port, the OBD port connected to and in electronic communication with the vehicle control system thereby establishing electronic communication between the TPMS relearning tool for receipt of information data from and sending information data to the vehicle control system;
receiving from the vehicle control system by the single relearning tool through the communication cable the vehicle make, model and year;
determining by the relearning tool a vehicle control system TPMS communication protocol based on the received vehicle make, model and year;
placing the vehicle control system in a relearning mode;
the relearning tool generating a second TPMS tire sensor data signal simulating the received first TPMS tire sensor data signal based on the received vehicle make, model and year and determined vehicle control system TPMS communication protocol, the simulated second TPMS tire sensor data signal including the tire sensor ID; and
emitting wirelessly from the TPMS relearning tool the simulated second TPMS tire sensor data signal to the vehicle control system wherein the vehicle control system TPMS one of sets or resets with the simulated second TPMS tire sensor data signal including the TPMS tire sensor ID.

16. The method of claim 1 wherein the received vehicle information from the vehicle control system through the engaged communication cable comprises the vehicle manufacturer, the vehicle model and the vehicle year.

17. The relearning tool of claim 7 wherein the transmitter wirelessly transmits the second TPMS tire sensor data signal to the vehicle control system while the communication cable is engaged to the vehicle OBD.

* * * * *